(12) United States Patent
  Clyne

(10) Patent No.: US 12,081,939 B2
(45) Date of Patent: *Sep. 3, 2024

(54) SUBMERSIBLE MICROPHONE SYSTEM WITH A COMPRESSIBLE SPACER

(71) Applicant: GoPro, Inc., San Mateo, CA (US)

(72) Inventor: Joshua Randall Clyne, Sunnyvale, CA (US)

(73) Assignee: GoPro, Inc., San Mateo, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/834,870

(22) Filed: Jun. 7, 2022

(65) Prior Publication Data

US 2022/0303675 A1 Sep. 22, 2022

Related U.S. Application Data

(63) Continuation of application No. 16/889,243, filed on Jun. 1, 2020, now Pat. No. 11,363,373, which is a continuation of application No. 16/043,264, filed on Jul. 24, 2018, now Pat. No. 10,674,256, which is a
(Continued)

(51) Int. Cl.
  *H04R 1/44* (2006.01)
  *G03B 17/08* (2021.01)
  *G03B 31/00* (2021.01)
  *H04N 23/51* (2023.01)
  *H04R 1/02* (2006.01)
  *H04R 1/04* (2006.01)
  (Continued)

(52) U.S. Cl.
  CPC .............. *H04R 1/44* (2013.01); *G03B 17/08* (2013.01); *G03B 31/00* (2013.01); *H04N 23/51* (2023.01); *H04R 1/04* (2013.01); *H04R 1/086* (2013.01); *H04R 3/007* (2013.01); *H04R 1/028* (2013.01); *H04R 2410/00* (2013.01); *H04R 2420/07* (2013.01); *H04R 2499/11* (2013.01)

(58) Field of Classification Search
  CPC . H04R 1/44; H04R 1/04; H04R 1/086; H04R 3/007; H04R 1/028; H04R 2410/00; H04R 2420/07; H04R 2499/11; G03B 17/08; G03B 31/00; H04N 23/51
  USPC ........... 381/334, 333, 386, 91, 122, 332, 87; 396/29, 28, 27, 26, 25, 31, 310; 348/81
  See application file for complete search history.

(56) References Cited

U.S. PATENT DOCUMENTS

| | | |
|---|---|---|
| 4,853,733 A | 8/1989 | Watanabe |
| 6,795,110 B1 | 9/2004 | Kossin |
| 10,051,363 B2 | 8/2018 | Clyne |
| (Continued) | | |

*Primary Examiner* — Vivian C Chin
*Assistant Examiner* — Con P Tran
(74) *Attorney, Agent, or Firm* — Young Basile Hanlon & MacFarlane, P.C.

(57) ABSTRACT

A camera with image and audio capture capabilities is configured to protect the internal audio components from the external environment. The camera includes a housing that allows passage of sound waves via a port from an external area of the camera to an internal area of the camera. The camera includes a circuit board with an opening and a microphone attached to a first surface of the circuit board adjacent to the opening. The camera includes a compressible spacer attached to a second surface of the circuit board. The second surface of the circuit board may be diametrically opposite to the first surface. The camera includes a waterproof membrane between the housing and the compressible spacer.

20 Claims, 5 Drawing Sheets

Related U.S. Application Data continuation of application No. 15/685,944, filed on Aug. 24, 2017, now Pat. No. 10,051,363.

(60) Provisional application No. 62/395,932, filed on Sep. 16, 2016.

(51) Int. Cl.
*H04R 1/08* (2006.01)
*H04R 3/00* (2006.01)

(56) References Cited

U.S. PATENT DOCUMENTS

| | | |
|---|---|---|
| 10,674,256 B2 | 6/2020 | Clyne |
| 2003/0123683 A1 | 7/2003 | Raicevich |
| 2005/0179813 A1 | 8/2005 | Fujii |
| 2008/0245452 A1 | 10/2008 | Law |
| 2010/0253826 A1* | 10/2010 | Green .................. H04N 23/51 348/E5.026 |
| 2011/0255850 A1 | 10/2011 | Dinh |
| 2012/0008928 A1 | 1/2012 | Ghali |
| 2014/0064546 A1 | 3/2014 | Szczech |
| 2014/0072141 A1 | 3/2014 | Cohen |
| 2016/0094911 A1 | 3/2016 | Kropf |
| 2017/0111751 A1 | 4/2017 | Miehl |
| 2018/0084340 A1 | 3/2018 | Clyne |
| 2018/0343518 A1 | 11/2018 | Clyne |
| 2020/0389725 A1 | 12/2020 | Clyne |

\* cited by examiner

SUBMERSIBLE MICROPHONE SYSTEM WITH A COMPRESSIBLE SPACER

CROSS REFERENCE TO RELATED APPLICATIONS

This application is a continuation of U.S. patent application Ser. No. 16/889,243, filed Jun. 1, 2020, now U.S. Pat. No. 11,363,373, which is a continuation of U.S. patent application Ser. No. 16/043,264, filed Jul. 24, 2018, now U.S. Pat. No. 10,674,256, which is a continuation of U.S. patent application Ser. No. 15/685,944, filed Aug. 24, 2017, now U.S. Pat. No. 10,051,363, which claims the benefit of U.S. Provisional Application No. 62/395,932, filed Sep. 16, 2016, the entire disclosures of which are hereby incorporated by reference.

TECHNICAL FIELD

This description generally relates to a camera system, specifically the audio systems of a camera system capable of being submerged.

BACKGROUND

Digital cameras are becoming faster, more powerful, and cheaper to produce. As the technology behind cameras has improved, a sub-set of miniaturized high quality "action cameras" used in non-traditional camera environments has been developed. During use in some of these environments, the camera may regularly be submerged and unsubmerged from water. However, audio performance may be protected by design considerations of the camera body.

DETAILED DESCRIPTION

Figure 1A:
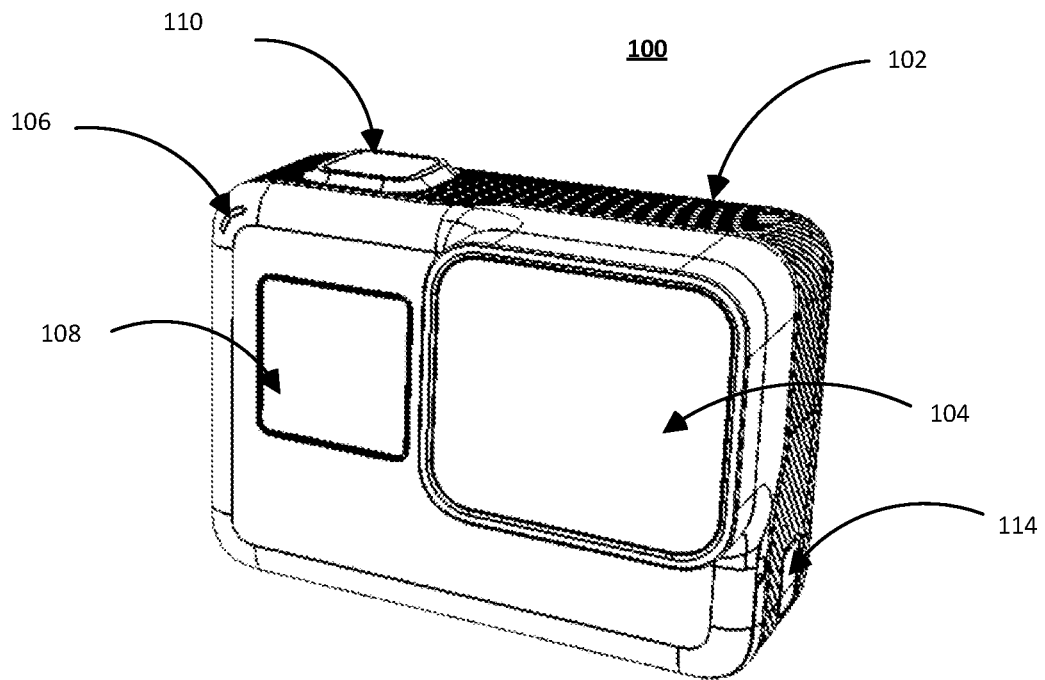
FIG. 1A is an isometric view of a submersible camera system, according to one embodiment.
Figure 1B:
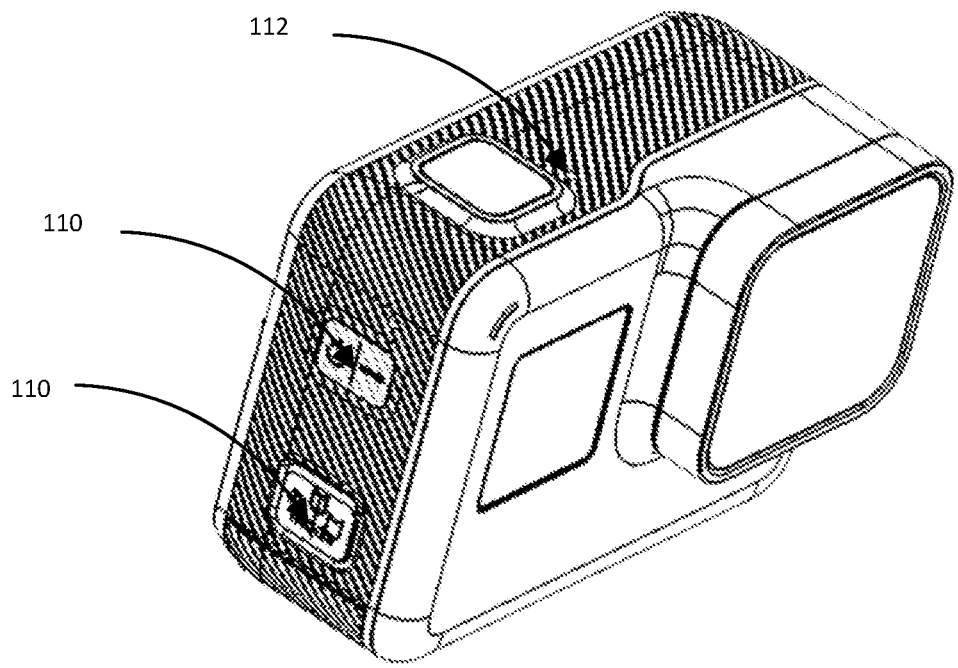
FIG. 1B is an isometric view of a submersible camera system, according to one embodiment.
Figure 1C:
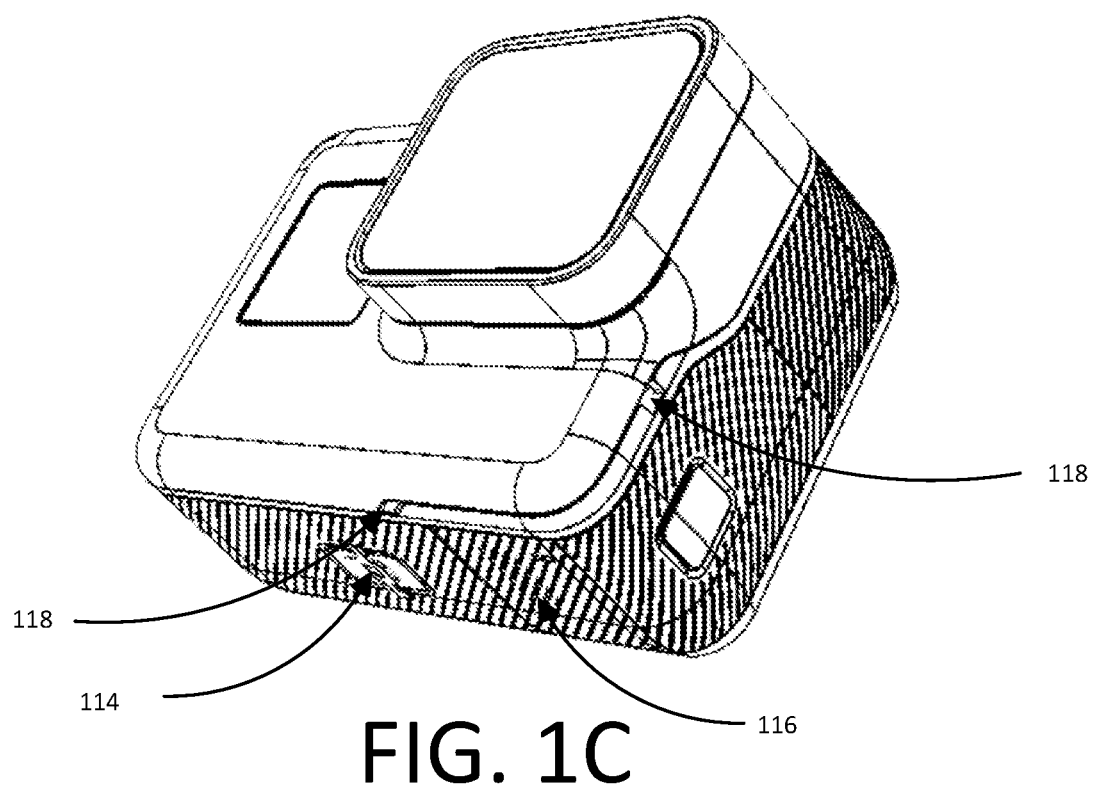
FIG. 1C is an isometric view of a submersible camera system, according to one embodiment.
Figure 1D:
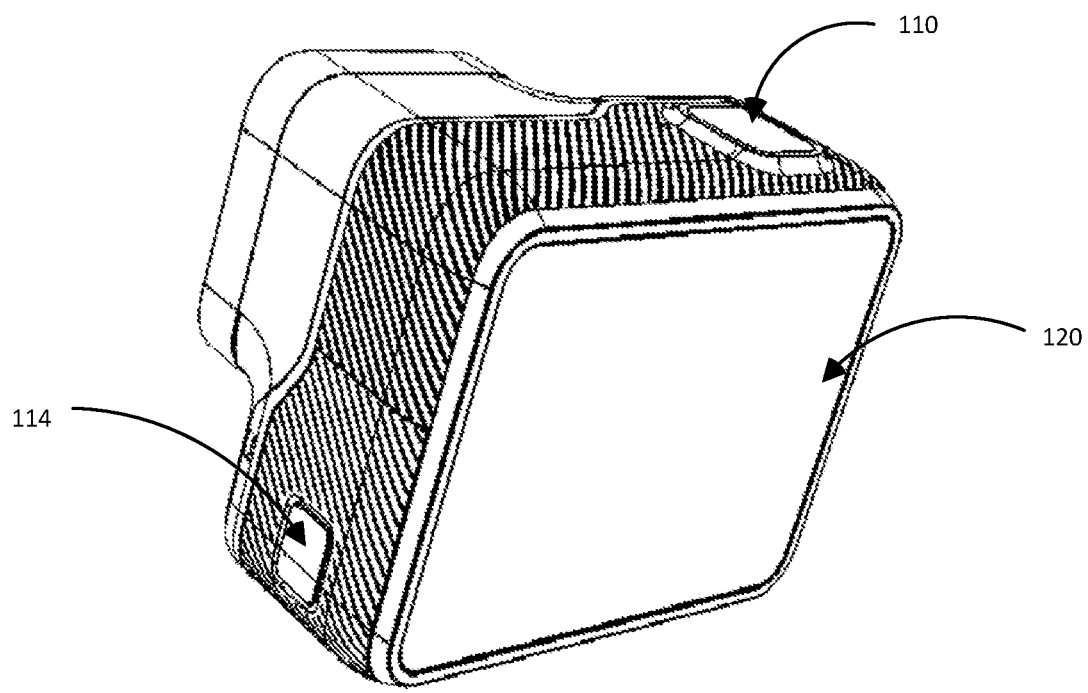
FIG. 1D is an isometric view of a submersible camera system, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system to record audio signals from the external environment without allowing moisture to compromise the internal electronic components is described. The camera system includes an image sensor and lens assembly to focus light from external the camera body onto the image sensor to capture images. The camera system also has an audio sensor assembly internal to the camera body with a microphone for converting ambient audio into electrical signals and an audio circuit board coupled to the microphone to process the electrical signals. The audio circuit board has an audio circuit board port, the audio circuit board port adjacent to the microphone and structured as an opening in the audio circuit board.

The camera system includes a compressible annulus coupled to the audio circuit board such that an opening in the compressible annulus at least partially aligns with the audio circuit board port. Coupled to the compressible annulus is a support annulus for providing manual stability to the internal components. The support annulus is structured such that an opening exists in the support annulus that at least partially aligns with the opening in the audio circuit board and opening in the compressible annulus. A sensor housing couples the support annulus, the compressible annulus and the audio sensor assembly to the camera body and provides mechanical support to the audio sensor assembly.

The camera system protects the internal electronic components with a waterproof membrane configured to prevent moisture from passing from external the camera body to the audio sensor assembly while allowing transmission of audio signals through the membrane. The waterproof membrane is structured such that the membrane covers the microphone over the opening in the circuit board port, the compressible annulus, and the support annulus.

Example Camera Configuration

FIGS. 1A-1D illustrate an embodiment of an example camera 100 that may include an audio system for use in a submersible camera system. The camera 100 may include a camera body 102 having a camera lens 104 structured on a front surface of the camera body 102, various indicators on the front of the surface of the camera body 102 (such as LEDs, displays, and the like), various input mechanisms (such as buttons, switches, and touch-screen mechanisms), and electronics (e.g., imaging electronics, power electronics, etc.) internal to the camera body 102 for capturing images via the camera lens 104 and/or performing other functions. The camera 100 may be configured to capture images and video, and to store captured images and video for subsequent display or playback.

The camera 100 can include various indicators, including the LED lights 106 and the LED display 108. The camera 100 can also include buttons 110 configured to allow a user of the camera 100 to interact with the camera 100, to turn the camera 100 on, and to otherwise configure the operating mode of the camera 100. The camera 100 can also include a microphone 112 configured to receive and record audio signals in conjunction with recording video. The side of the camera 100 may include an I/O interface 114. The camera may also include a microphone 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the camera 100 may include a lens 104 configured to receive light incident upon the lens and to direct received light onto an image sensor internal to the lens.

The camera 100, includes a camera exterior that encompasses and protects the camera's internal electronics, which are further described in later sections. The camera exterior includes 6 surfaces (i.e. a front face, a left face, a right face, a back face, a top face, and a bottom face), wherein the exterior surfaces form a rectangular cuboid. Furthermore, both the front and rear surfaces of the camera 100 are substantially rectangular in shape. The camera 100 can be made of a rigid material such as plastic, aluminum, steel, or fiberglass. Additional camera features, such as the features described above, may be affixed to an exterior of the camera. In some embodiments, the camera described herein includes features other than those described below. For example, instead of a single interface button, the camera can include additional buttons or different interface features, such as multiple microphone openings to receive voice or other audio commands.

Submersible Microphone System

Integrated Microphone Assembly

An integrated microphone assembly for use in a submersible camera system may include a microphone system internal to the camera body separated from an external environment by a waterproof membrane configured to protect the electronic components internal to the camera body while still allowing translation of vibrational sound waves through the microphone membrane. The integrated microphone system may be internal to the camera body with the microphone configured to collect audio signals and sound waves from sources external the camera body through the microphone membrane.

Figure 2A:
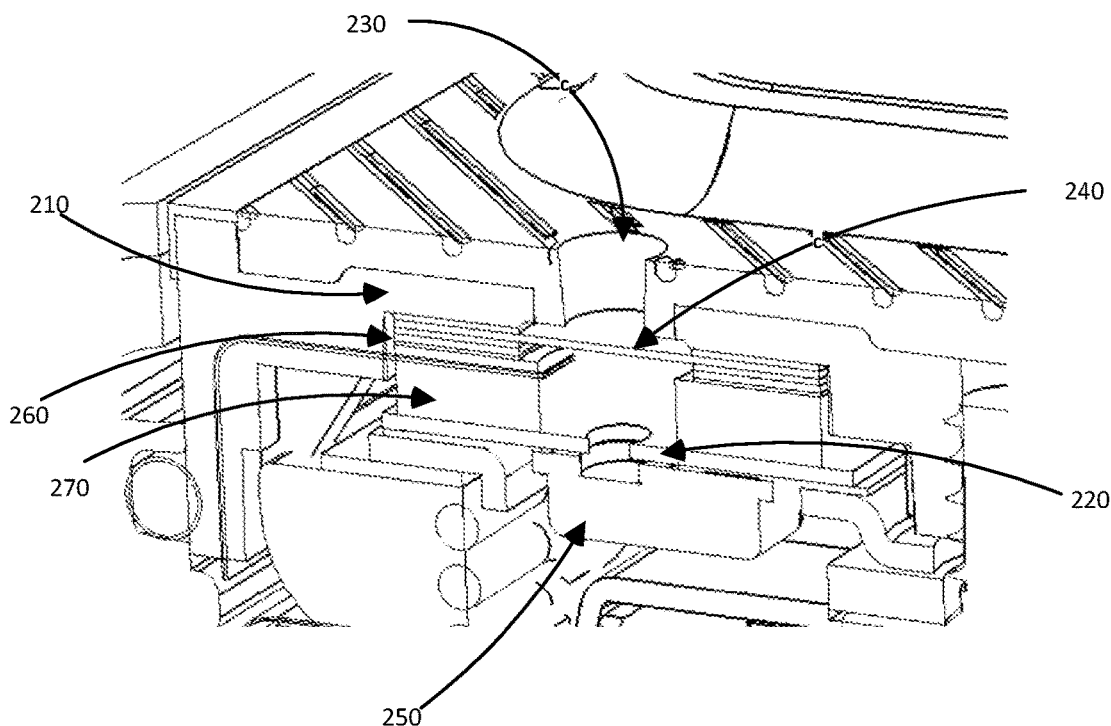
FIG. 2A is an isometric cross-sectional view of a microphone system in a submersible camera system, according to one embodiment.
Figure 2B:
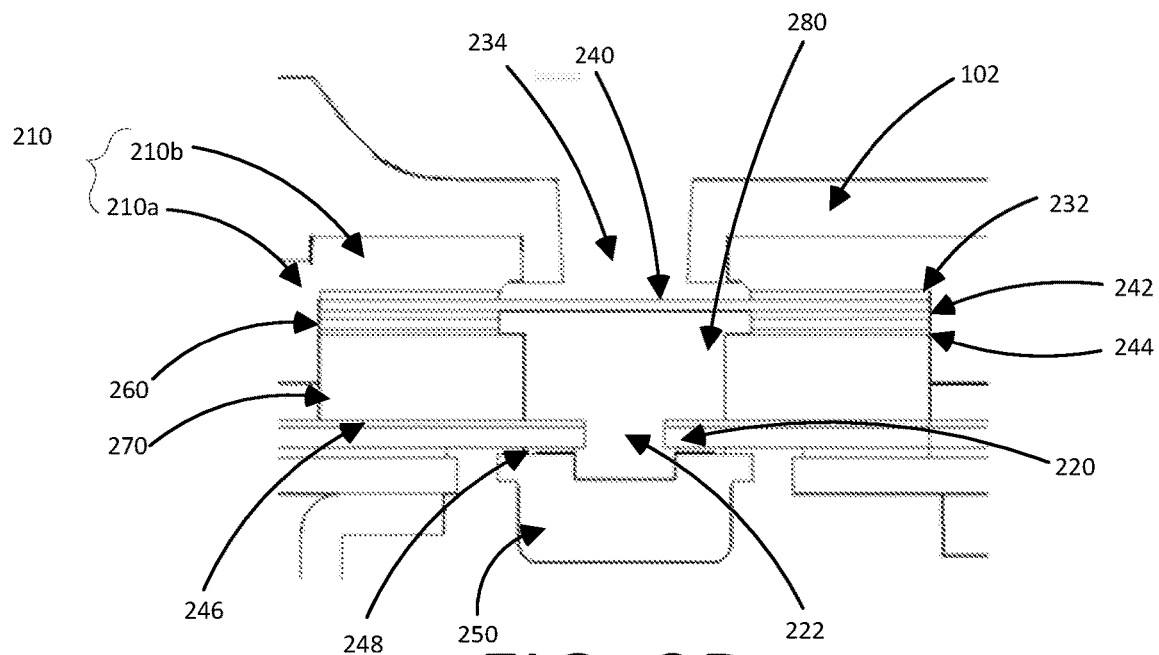
FIG. 2B is a cross-sectional view of a microphone system in a submersible camera system, according to one embodiment.

FIGS. 2A and 2B illustrate different cross-sectional views of an embodiment of an integrated microphone assembly 200 that may be used in a submersible camera system and illustrates components of the camera system internal to the camera body. The integrated microphone system can include a microphone housing, control components, components external to the microphone membrane (hereafter, external microphone components), components internal to the microphone membrane (hereafter, internal microphone components), and the microphone membrane, each of which are discussed in further detail below.

In the embodiments described below, the integrated microphone system is configured to detect sound waves entering a cavity of the camera body via the top facing surface of the camera body (e.g., the sound waves enter downwards in FIG. 2B); however, in alternative embodiments, the microphone may be placed in any internal location of the camera system and may detect audio from sound waves entering through a different external face of the camera (e.g., a top face, bottom face, side face, front face, or back face).

Microphone Housing

Components of the integrated microphone system may be coupled to the microphone housing 210. The microphone housing 210 may be configured to encapsulate all components of the integrated microphone system such that the microphone housing helps maintain structural integrity of the microphone components throughout the use in action settings and harsh environments.

In the illustrated embodiment, the microphone housing can include a set of walls with each wall comprising two sub sections: the housing sidewall 210a and the housing coupler 210b. Components of the housing may have a top side facing an internal top surface of the camera (e.g. facing upwards in the orientation of FIG. 2B) and a bottom side facing an internal bottom surface of the camera (e.g. facing downwards in the orientation of FIG. 2B). The components have a proximal side and a distal side, the proximal side facing the center of the microphone structure and the distal side facing away from the center of the microphone structure internal to the camera.

The distal side of the housing coupler 210b is coupled to the proximal side of the housing sidewall 210a such that the housing coupler extends from the housing wall towards the center of the microphone system. The housing coupler 210b and housing sidewall 210a are further coupled such that the top side of the housing coupler is non-coplanar to the top side of the housing wall, such that the housing coupler is raised (e.g. oriented closer to the top of FIG. 2B) from the housing sidewalls.

The perimeter of the housing 210 can approximate the shape of the external perimeters of the internal microphone components and the external microphone components. In the illustrated embodiment, the perimeter shape of the microphone housing can be a substantially circular region.

The microphone housing 210 may couple to the camera body 102 such that entirety of the integrated microphone system is internal to the camera body 102 and is substantially flush with the surfaces of the camera body. In the illustrated embodiment, the top side of housing coupler 210a and the top side of the housing sidewall 210b can be coupled to the internal facing surface of the top side of the camera body 102. In some embodiments the microphone housing may be coupled to the camera housing via, a screw, a latch, or any other connective component.

In some embodiments, the microphone housing 210 can include a gasket. The gasket can be used to equalize pressure within the microphone housing when the microphone is submerged or removed from a wet environment. In an alternative environment, the microphone housing 210 can also include an air permeable membrane. The air permeable membrane may be configured to allow some air from external the camera housing 102 to internal the microphone system. The air permeable membrane may be configured to assist neutralizing pressure differentials within the system when moved into and out of wet environments.

Control Components

The camera system may be configured to concurrently capture video and audio from the surrounding environment via the visual and audio systems of the camera. Control of the integrated microphone system may be accomplished using a combination of control mechanisms that can configure the microphone system and allow record audio for playback in variety of external environments. The components that control the microphone system may include input/output hardware, a microphone printed circuit board 220, sensors, and similar.

Microphone Printed Circuit Board

The integrated microphone system may be physically and electrically coupled to a microphone printed circuit board (MPCB) 220 that controls the translation of detected sound waves into electrical signals. The electrical signals can then be converted into encoded audio signals to be processed by the MPCB. The MPCB may be coupled to the microphone via electrical cabling, wireless communication devices, optical communication devices, or similar. The MPCB may include various electronic components for the control of the microphone system including input/output devices, a microprocessor, power electronics, electrical components such as resistors, inductors, etc., and sensor devices used to control the output of MPCB. The MPCB may be electrically coupled to other components of the submersible camera system to control operation of the integrated camera system, including buttons on the body of the camera and the interactive display device, or similar.

The MPCB may be electrically coupled to external devices for control of the microphone system via the input/output electronics of the submersible camera system. The external devices used to control the operation and configuration of the microphone system may include a desktop computer, a personal computing device, a cell phone, a website, a social networking platform, or similar. The input/output mechanisms electrically coupling the MPCB to external devices may include electrical cabling, wireless communication systems, optical communication devices, or similar.

Sensors

The control components may include various sensor mechanisms to monitor the state of the microphone system. The sensors may be coupled to the MPCB, the microphone, or the microphone system such that the sensors are able to sense conditions of the microphone during audio recording in dry and wet environments. The sensor systems may include barometers, thermometers, gyroscopes, global positioning systems, accelerometers, microphones, or similar. The sensors may be configured to sense, measure and monitor any of temperature, pressure, moisture, position, velocity, acceleration, orientation, audio playback quality, membrane integrity, or similar.

External Microphone Components

The components of the integrated microphone system may be coupled by the microphone housing 210 and are internal to the camera body 102. The components may be grouped into two subsections: external microphone components and internal microphone components. External components may include a microphone port 230 and the first microphone adhesive 232. The components allow transmission of sound waves from external the camera body 102 to internal the camera body 102.

Microphone Port

In the illustrated embodiment, the microphone port 230 can be on the top surface of the camera body. The microphone port 230 may allow the passage of vibrational sound waves from external the camera body 102 to internal the camera body 102. The microphone port 230 may be a circular port from the external face to the internal face of the top surface of the camera body 102. In some embodiments the microphone port may be a square port, a rectangular port, or any other shaped port. In other embodiments, the microphone port may be an array of ports of various shapes and sizes. In still other embodiments, the microphone port 230 may be replaced with membranes or substantially thinned areas of the camera body 102 that allow passage of sound waves through the camera body. In the illustrated embodiment, the microphone port 230 has a first radius on the external face of the camera body 102 and a second radius on the internal face of the camera body such that the sidewalls of the microphone port taper from the first radius to the second radius.

First Microphone Cavity

The first microphone cavity 234 can comprise an area enclosed by the sidewalls of the microphone port 230, the microphone housing 210 and the microphone membrane 240. The first microphone cavity 234 may be exposed to the environment and allows passage of vibrational sound waves from external to the camera body 102 towards the microphone membrane 240 internal the camera body.

Membrane

The internal and external components of the microphone system may be separated by the microphone membrane 240. The microphone membrane 240 can be configured to allow transmission of acoustic waves from the external components to the internal components.

The microphone membrane 240 may include a substantially circular film with an outside perimeter aligned with the microphone housing 210 that is configured to protect the microphone 250 from dust, water, and other adverse materials and environments. The microphone membrane 240 may have a front side and a back side. The front side of the microphone membrane may face an internal top surface of the camera (e.g. facing upwards in the orientation of FIG. 2B) and the backside may face an internal bottom surface of the camera (e.g. facing downwards in the orientation of FIG. 2B). The front side of the microphone membrane 240 may be coupled to the bottom side of the housing coupler 210b by the first microphone adhesive 232. The first microphone adhesive 232 may be a pressure sensitive adhesive (PSA) placed at the interface between the back side of housing coupler 210b and the front side of the microphone membrane 240 and form a bond between the two when pressure is applied to the interface during assembly of the camera system 100. In other embodiments, the adhesive is not pressure sensitive.

The microphone membrane 240 can be configured to vibrate and translate sound waves from external to the camera body through the microphone membrane 240 towards the microphone such that the microphone 250 is able to detect audio signals from the external environment. The microphone membrane 240 may vibrate in submerged, partially wet, and dry environments such that audio recording in all environments is possible. The microphone membrane 240 can be further configured to deform without breaking when the pressure differential between the external and internal components of the integrated microphone system is high, e.g. in a submerged environment.

The microphone membrane 240 may be constructed of a material that is impermeable to air, water, and particulate matter. In some embodiments the microphone membrane 240 may be constructed from plastic, rubber, foils, or similar. In an embodiment, the membrane can be silicone and may be for example, approximately 0.1 mm in thickness.

Internal Microphone Components

The internal components of the microphone system can be sensitive to the external environment and are protected by the microphone membrane 240. Components internal to the camera body may include the MPCB 220, the microphone 250, the second microphone adhesive 242, the third microphone adhesive 244, the fourth microphone adhesive 246, the fifth microphone adhesive 248, the microphone support annulus 260, and the microphone compressible annulus 270. The components can allow transmission of sound waves from external the camera body 102 to the internal microphone 250 through the microphone membrane 240 such that the sound waves can be converted into encoded audio signals.

Microphone Support Annulus

The microphone support annulus 260 may be a substantially circular structure with an inner radius, an outer radius and an outer perimeter substantially aligned with corresponding proximal sides of the microphone housing 210 and is configured to support the microphone membrane 240 during vibration such that the microphone membrane 240 does not bow inwards to the point of failure. In the illustrated embodiment, the outer radius of the support annulus 260 may be substantially similar to the radius of the microphone membrane 240.

The microphone support annulus 260 may have a front side, a back side, distal facing walls, and proximal facing walls. The front side of the support annulus 260 may face an internal top surface of the camera (e.g. facing upwards in the orientation of FIG. 2B) and the backside may face an internal bottom surface of the camera (e.g. facing downwards in the orientation of FIG. 2B). The front side of the support annulus 260 may be coupled to the back side of the microphone membrane with the second microphone adhesive 242. The second microphone adhesive 242 may be a PSA and may be placed at the interface between the front side of the support annulus 260 and the back side of the microphone membrane 240 and can form a bond between the two when pressure is applied to the interface during assembly of the camera system. In other embodiments, the adhesive is not pressure sensitive.

The microphone support annulus 260 may be constructed of a material with a high mechanical stiffness to support the microphone membrane. In one embodiment, the microphone support annulus 260 comprises steel approximately 0.2 mm thick. In other embodiments, the support annulus 260 can be any other material such as plastic, ceramic, metal, or any other material with a higher mechanical stiffness than the microphone membrane.

Microphone Compressible Annulus

The microphone compressible annulus 270 may be a substantially circular structure with an inner radius, an outer radius and an outer perimeter substantially similar to the microphone housing 210 and is configured to allow the microphone system to compensate for pressure differentials on opposing sides of the microphone membrane 240 by compressing and decompressing. This compensation can further aid in preventing the microphone membrane 240 from breaking at high pressure differentials on opposite sides of the membrane. In the illustrated embodiment, the inner radius of the compressible annulus 270 may be smaller than the inner radius of the support annulus 260. Furthermore, the outer radius of the compressible annulus 270 and the outer radius of the support annulus 260 may be substantially similar.

The microphone compressible annulus 270 may have a front side, a back side, distal facing walls, and proximal facing walls. The front side of the compressible annulus 270 may face an internal top surface of the camera (e.g. facing upwards in the orientation of FIG. 2B) and the backside may face an internal bottom surface of the camera (e.g. facing downwards in the orientation of FIG. 2B). The front side of the compressible annulus 270 may be coupled to the back side of the support annulus with the third microphone adhesive 242. The third microphone adhesive 242 may be a PSA and may be placed at the interface between the front side of the compressible annulus 270 and the back side of the support annulus 260 and can form a bond between the two when pressure is applied to the interface during assembly of the camera system. In other embodiments, the adhesive is not pressure sensitive.

The compressible annulus 270 may be constructed of a material with a mechanical stiffness that allows deformation of the compressible annulus 270. In an embodiment, the compressible annulus comprises Nitto SRS70P Open Cell Foam that is approximately 0.2 mm thick with a density of 0.70 g/cm$^3$.

The deformation of the compressible annulus 270 may originate from a compressive force between auxiliary components internal to the camera body 102 coupled to the back side of the integrated microphone system 200. Before assembly, the compressible annulus 270 may have an original distance between the front side and the back side. During assembly, the compressive force can cause the compressible annulus 270 to reduce in volume; i.e., the distance between the front side and the back side can reduce as a result of the compressive force. The deformation of the compressible annulus 270 may also result from the pressure differential that can exist between opposite sides of the microphone membrane. The compressible annulus 270 may be further configured to deform in such a way that the pressure differential is minimized over time.

MPCB

The MPCB 220 may have a front side and a back side. The front side of the MPCB 220 may face an internal top surface of the camera body 102 (e.g. facing upwards in the orientation of FIG. 2B) and the backside may face an internal bottom surface of the camera (e.g. facing downwards in the orientation of FIG. 2B). The front side of the MPCB may be coupled to the back side of the compressible annulus with the fourth microphone adhesive 246. The fourth microphone adhesive 246 may be a PSA and may be placed at the interface between the front side of the MPCB 220 and the back side of the compressible annulus 270 and can form a bond between the two when pressure is applied to the interface during assembly of the camera system. In other embodiments, the adhesive is not pressure sensitive. In the illustrated embodiment, the top side of the MPCB 220 can have a larger surface area than the bottom side of the compressible annulus 270 such that some areas of the top side of the MPCB are not coupled to the bottom side of the compressible annulus by the fourth microphone adhesive 246.

The MPCB 220 may also include a MPCB port 222 connecting the front side of the MPCB to the back side of the MPCB and allowing transmission of sound waves through the port. In the illustrated embodiment the MPCB 220 can have a radius less than the internal radius of the compressible annulus 270 (the terms compressible spacer and compressible annulus are used interchangeably throughout the specification). The MPCB port is located such that the entirety of the MPCB port is within an area represented by a circle formed by the inner radius of the compressible annulus 270.

Second Microphone Cavity

The second microphone cavity 280 can be a region between the microphone membrane 240, the proximal walls of the support annulus 260, the proximal walls of the compressible annulus 270, the portion of the top side of the MPCB 220 that is not coupled to the compressible annulus, and the MPCB port 222. The second microphone cavity may be configured to allow translation of sound waves from external the camera body through the microphone membrane 240 and towards the microphone 250.

Microphone

The microphone 250 can be configured to convert sound waves propagated from external the camera body into electrical signals that may be encoded by an encoder into an audio signal capable of playback by a speaker system.

The microphone may have a front side and a back side. The front side of the microphone 250 may face an internal top surface of the camera (e.g. facing upwards in the orientation of FIG. 2B) and the backside may face an internal bottom surface of the camera (e.g. facing downwards in the orientation of FIG. 2B). The front side of the microphone may be coupled to the back side of the MPCB about the MPCB port with the fifth microphone adhesive 248. The fifth microphone adhesive 248 may be a PSA and may be placed at the interface between the front side of the microphone 250 and the back side of the MPCB 220 and can form a bond between the two when pressure is applied to the interface during assembly of the camera system. In other embodiments, the adhesive is not pressure sensitive. In the illustrated embodiment, the bottom side of the MPCB 220 has a larger surface area than the top side of the microphone 250 such that an area on of the bottom side of the MPCB if 220 is not coupled to the top side of the microphone by the fourth microphone adhesive 246.

Submersed Conditions

Figure 3:
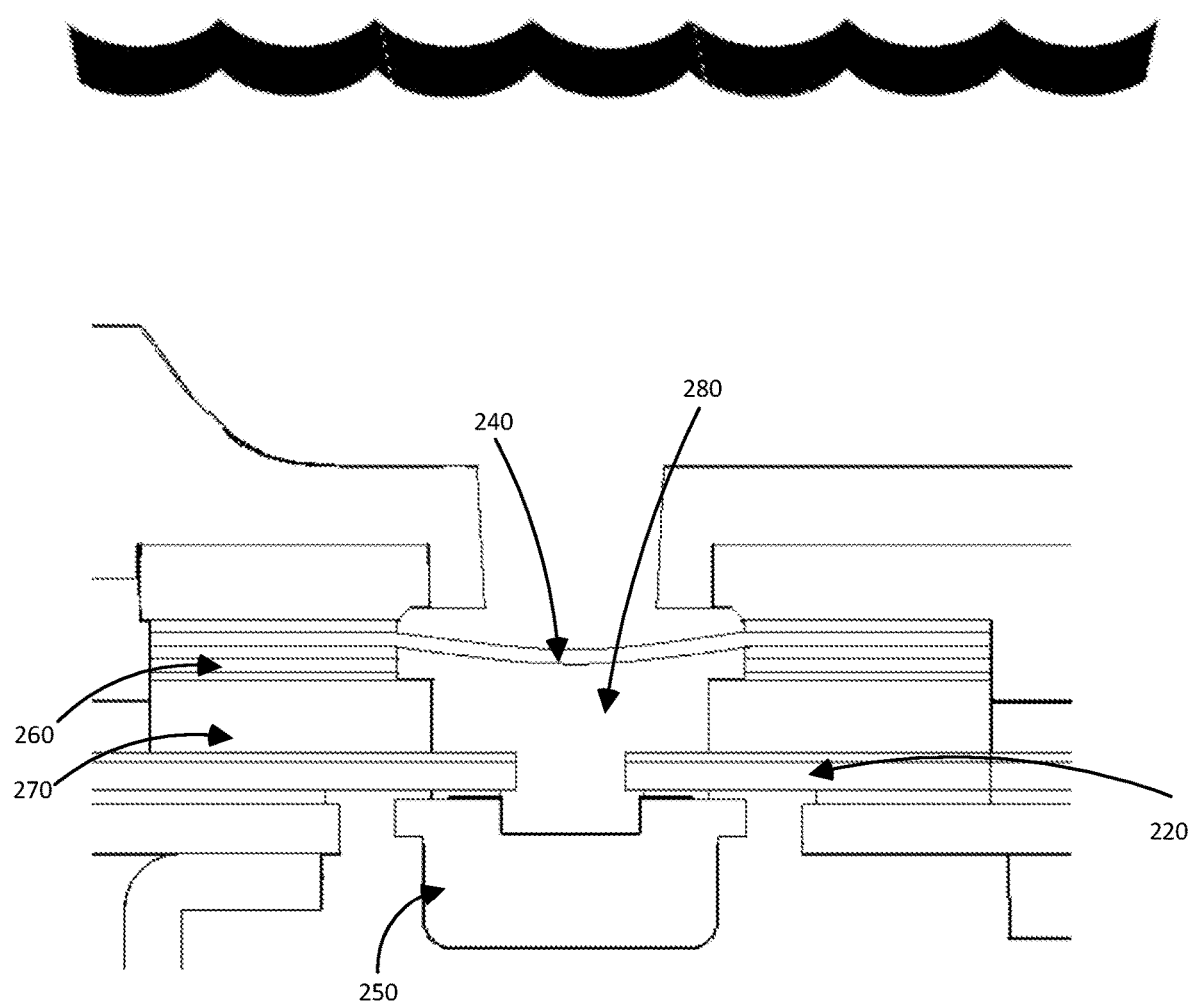
FIG. 3 is a cross-sectional view of a microphone system in a submersible camera system when the camera is submerged, according to one embodiment.

FIG. 3 illustrates the submersible camera system submerged in a wet environment. In the illustrated embodiment the microphone membrane 240 can bow towards the center of the camera (e.g. towards the bottom of the page) due to the water pressure external to the camera body 102 and microphone membrane 240. The camera may be configured such that as the pressure increases, compressible annulus 270 compresses to compensate for the pressure differential on opposing sides of the bowed microphone membrane. The support annulus and the microphone housing 210 can provide mechanical support to the microphone membrane 240 allowing the bowing when submerged underwater to not compromise the mechanical integrity of the microphone membrane 240 when being deformed. The microphone 250 may be configured to encode audio signals from vibrational waves translated to the microphone via the microphone membrane in a submerged environment.

When the camera is removed from wet environment, the water drains from the camera system and the compressible spacer, and microphone membrane return to their nominal non-deformed positions. The microphone system may be additionally configured for generation of audio signals from sound waves translated to the microphone in a dry environment.

Example System Configuration

Figure 4:
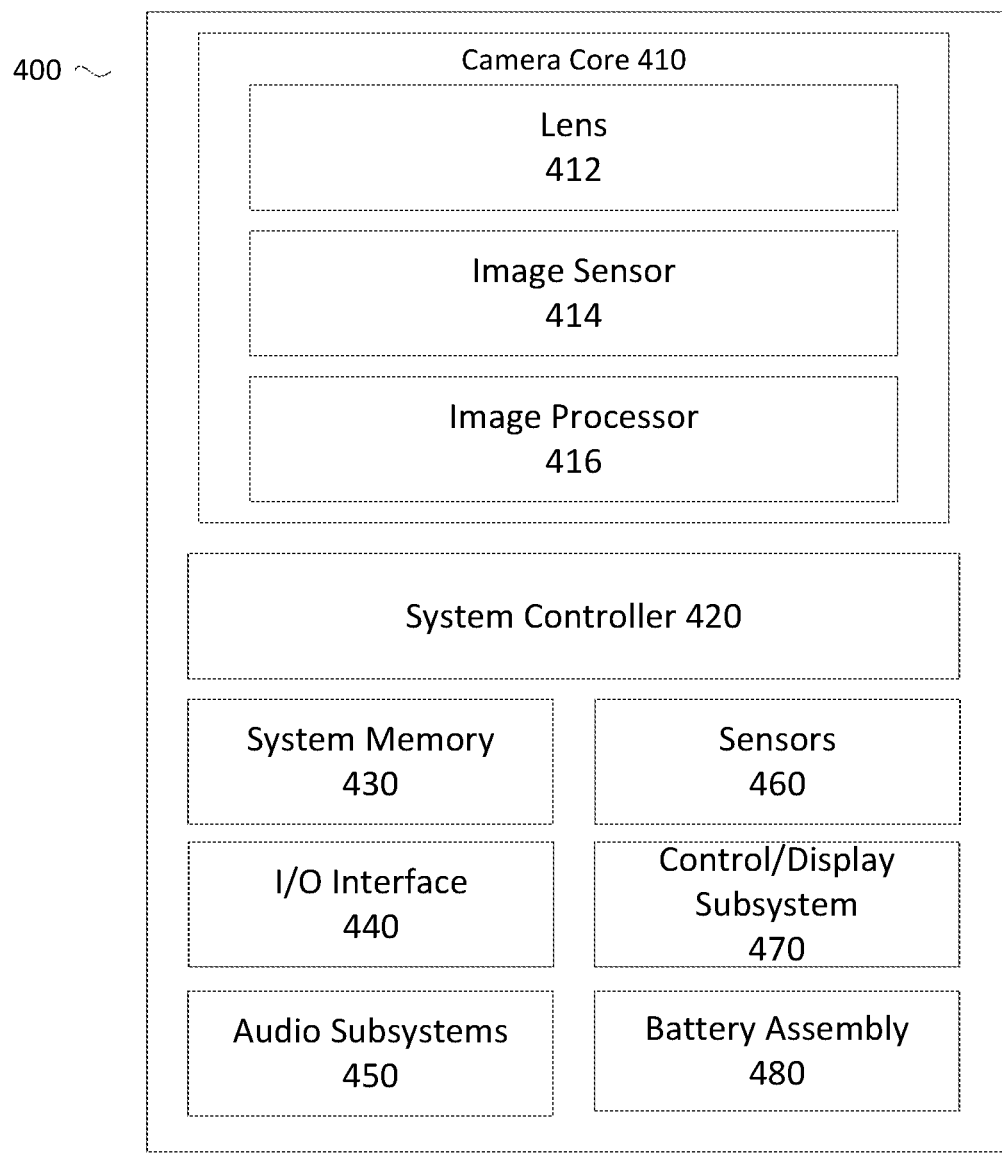
FIG. 4 is an illustration of a submersible camera system architecture, according to one embodiment.

FIG. 4 is a block diagram illustrating a system level example camera architecture 400 corresponding to the camera demonstrated in FIGS. 1A-1D. The camera architecture 200 may include a thermal management system for a camera battery. The thermal management system may be configured for operation in low ambient temperature environments. The camera architecture 400 may include a camera core 410, a system controller 420, a system memory 430, an I/O interface 440, an audio subsystem 450, sensors 260, a control/display subsystem 470, and a battery assembly 480. The camera core may include a lens 412, an image sensor 414, and an image processor 414.

The components in FIG. 4 are grouped functionally and do not necessarily reflect a physical architecture of the camera architecture 400. For example, as described above, in one embodiment, the control/display subsystem 470 is embodied in a separate physical integrated circuit chip from the image processor 416. The integrated circuit chip including the image processor 416 also may include, for example, the image sensor 412, the system controller 420, system memory 430 and portions of the audio sub-system 450, I/O interface 440, and control/display sub-system 470.

In the example embodiment illustrated in FIG. 4, the camera architecture 400 has a camera core 410 that may include a lens 412, an image sensor 414, and an image processor 416. The camera architecture 400 additionally may include a system controller 420 (e.g., a microcontroller or microprocessor) that controls the operation and functionality of the camera architecture 400. The camera architecture 400 may include system memory 430 configured to store executable computer instructions that, when executed by the system controller 420 and/or the image processors 416, perform the camera functionalities described hereafter. In some example embodiments, a camera architecture 400 may include multiple camera cores 410 to capture fields of view in different directions which may then be stitched together to form a cohesive image. For example, in an embodiment of a spherical camera system, the camera architecture 200 may include two camera cores 410 each having a hemispherical or hyper hemispherical lens that each capture a hemispherical or hyper-hemispherical field of view which are stitched together in post-processing to form a spherical image. In other embodiments, multiple camera cores 410 may operate in separate cameras and be integrated via the I/O interface 440. For example, in an embodiment of a camera array system, the camera architecture may include at least two camera cores on at least two different cameras connected via the I/O interface 440 whose images are stitched together in post-processing to create a larger camera image.

The lens 412 can be, for example, a wide angle lens, hemispherical, or hyper hemispherical lens that focuses light entering the lens to the image sensor 414 which captures images and/or video frames. The image sensor 414 may capture high-definition video having a resolution of, for example, 480p, 720p, 1080p, 4 k, or higher, or any other video resolution. For video, the image sensor 414 may capture video at frame rates of, for example, 30 frames per second, 60 frames per second, or higher, or any other possible frame rates. The image processor 416 performs one or more image processing functions of the captured images or video. For example, the image processor 416 may perform a Bayer transformation, de-mosaicing, noise reduction, image sharpening, image stabilization, rolling shutter artifact reduction, color space conversion, compression, or other in-camera processing functions. The image processor 416 may furthermore perform the timing metric calculations. The timing metric calculations may include determining frame rates, shutter speeds, exposure times, battery lifetimes, rate of change of battery lifetimes, time stamping of image, or similar. Processed images and video may be temporarily or persistently stored to system memory 430 and/or to a non-volatile storage, which may be in the form of internal storage or an external memory card. Additionally, the image processor may be configured to capture video or images and not store them in the system memory 430.

An input/output (I/O) interface 440 may transmit and receive data from various external devices. For example, the I/O interface 440 may facilitate the receiving or transmitting video or audio information through an I/O port. Examples of I/O ports or interfaces include USB ports, HDMI ports, Ethernet ports, audio ports, and the like. Furthermore, embodiments of the I/O interface 440 may include wireless ports that can accommodate wireless connections. Examples of wireless ports include Bluetooth, Wireless USB, Near Field Communication (NFC), and the like. The I/O interface 440 may also include an interface to synchronize the camera architecture 400 with other cameras or with other external devices, such as a remote control, a second camera, a smartphone, a client device, or a video server.

The audio subsystem 450 includes, for example, one or more microphones, one or more microphones, one or more audio processors to capture and process audio data correlated with video capture, and one or more audio processors to play and process audio data correlated with video capture. In one embodiment, the audio subsystem 450 includes a microphone array having two or more microphones arranged to obtain directional audio signals. In another embodiment, the audio subsystem includes microphone systems described in FIGS. 2A-2B. The audio subsystem may be configured to playback or record audio signals when the loudspeaker and microphone systems are at least partially submerged in water or in a dry environment. The audio subsystem 450 may interact with the sensors 460 to detect the amount of moisture in the camera system and adjust the audio playback to compensate for adverse effects created by moisture in the audio subsystems.

Sensors 460 may capture various metadata concurrently with, or separately from, video capture. For example, the sensors 460 may capture time-stamped location information based on a global positioning system (GPS) sensor, and/or an altimeter. Other sensors 460 may be used to detect and capture orientation of the camera architecture 400 including, for example, an orientation sensor, an accelerometer, a gyroscope, or a magnetometer. Additional sensors may be used to detect and capture information about the camera system such as internal or external temperature of camera components such as the camera core, the system controller or the battery assembly. The sensors 460 may additionally detect the presence of liquids within or external to the camera body or the proximity of liquids to camera components. The sensors may also be configured to monitor the integrity of camera components such as microphones, speakers, membranes, lenses, or any other component of the camera coupled to a sensor. The sensors may also comprise components capable of monitoring position, pressure, time, velocity, acceleration or similar.

Sensor data captured from the various sensors 460 may be processed to generate other types of metadata. For example, sensor data from the accelerometer may be used to generate motion metadata, comprising velocity and/or acceleration vectors representative of motion of the camera architecture 400. Sensor data from a GPS sensor can provide GPS coordinates identifying the location of the camera architecture 400, and the altimeter can measure the altitude of the camera architecture 400. In one embodiment, the sensors 460 are rigidly coupled to the camera architecture 400 such that any motion, orientation or change in location experienced by the camera architecture 400 is also experienced by the sensors 460. The sensors 460 furthermore may associate a time stamp representing when the data was captured by each sensor. In one embodiment, the sensors 460 automatically begin collecting sensor metadata when the camera architecture 400 begins recording a video. In still other embodiments the sensors may be external to the camera body and transmit the sensor data or sensor metadata to the camera via the I/O interface 440. In one embodiment, the sensors may be configured to sense the amount of moisture within the first microphone cavity 234, the second microphone cavity 280, or present on or near the microphone membrane 240. In still another embodiment, the sensors may be configured to detect the amount of pressure on the microphone membrane 240 or the amount of deformation of the microphone membrane 240. Further, the sensors 460 may be configured to detect abnormalities in the vibrations of the microphone membrane 240 during audio recording when the microphone membrane is at least partially wet 240 and the vibrations of the membrane are dampened.

A control/display subsystem 470 includes various control and display components associated with operation of the camera architecture 400 including, for example, LED lights, a display, buttons, microphones, speakers, and the like.

The battery assembly 480 may include power cells for powering various components of the camera system. For example the power cells may be a Lithium-Ion battery, a Nickel-Cadmium battery, a Nickel-metal-Hydride battery, a Lithium-Polymer battery, a Lead-Acid battery, a solar-cell, a power cord to an external power source, a kinetic power generation system, or any other component used to power an electrical system. The battery assembly may be configured to be controlled by the system controller 420, with the system controller dictating which components of the camera sub-systems and components will receive power during operation. The battery assembly 480 may be controlled by various input mechanisms (such as buttons, switches, and touch-screen mechanisms) on the external body of the camera or by directions received via the I/O interface 460. Additionally, the battery assembly 480 may be removable from the camera system to allow for recharging the power cells of the battery assembly or replacing the current battery assembly 480 with a different battery assembly 480.

Alternative Embodiments

The surfaces and sides described in the previous section are arbitrary; one skilled in the art will see that the microphone system may be affixed to any internal surface of the camera system in similar orientations.

In one embodiment of the system, the microphone housing may further function as a gasket, applying force to the back face of the microphone membrane and adhesive such that the adhesive does not peel away from the support annulus.

In one embodiment of the system, there may be an air, and not water, permeable membrane within the camera housing to assist in equalizing the pressure internal and external the membrane when the camera is removed from water. In this embodiment, the air permeable membrane can be GORE TPV570 0.18 mm thick.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs the disclosed embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera comprising:
a housing comprising a port configured to allow passage of sound waves from an external area of the camera to an internal area of the camera;
a circuit board comprising an opening;
a microphone coupled to a first surface of the circuit board adjacent to the opening;
a compressible spacer coupled, by an adhesive, to a second surface of the circuit board that is diametrically opposite to the first surface of the circuit board, wherein the compressible spacer is located entirely on a side of the circuit board adjacent to the second surface, and wherein the compressible spacer is substantially circular with an opening extending through the compressible spacer that is aligned with the microphone; and
a waterproof membrane disposed between the housing and the compressible spacer and covering the opening of the compressible spacer, wherein the waterproof membrane is configured to vibrate so that sound waves extend there through to the microphone.

2. The camera of claim 1 further comprising:
a support structure disposed between the waterproof membrane and the compressible spacer.

3. The camera of claim 2, wherein the support structure has a mechanical stiffness greater than a mechanical stiffness of the waterproof membrane.

4. The camera of claim 2, wherein the support structure is comprised of plastic, ceramic, or metal.

5. The camera of claim 1, wherein the port comprises a first radius on an external surface of the housing and a second radius on an internal surface of the housing.

6. The camera of claim 5, wherein the first radius is greater than the second radius.

7. The camera of claim 1, wherein the waterproof membrane is deformable without breaking when a pressure differential occurs between an outside of the camera and an inside of the camera.

8. The camera of claim 1, wherein the adhesive is a pressure sensitive adhesive.

9. A microphone assembly comprising:
a port configured to allow passage of sound waves from an external area of a camera housing to an internal area of the camera housing;
a microphone coupled to a first surface of a circuit board;
a compressible spacer located entirely on one side of a second surface of the circuit board, the compressible spacer having a substantially circular shape with an opening extending through the compressible spacer and a first surface coupled to the second surface of the circuit board via an adhesive, wherein the second surface of the circuit board is diametrically opposite to the first surface of the circuit board; and
a waterproof membrane disposed between the port and the second surface the compressible spacer, wherein the waterproof membrane extends over the opening of the compressible spacer and is configured to vibrate so that sound waves extend there through to the microphone.

10. The microphone assembly of claim 9 further comprising:
a support structure disposed between the waterproof membrane and the compressible spacer.

11. The microphone assembly of claim 10, wherein the support structure has a mechanical stiffness greater than a mechanical stiffness of the waterproof membrane.

12. The microphone assembly of claim 10, wherein the support structure is comprised of plastic, ceramic, or metal.

13. The microphone assembly of claim 10, wherein the port comprises a first radius and the support structure comprises a second radius.

14. The microphone assembly of claim 13, wherein the second radius is greater than the first radius.

15. The microphone assembly of claim 9, wherein the waterproof membrane is shaped to bow inward and the compressible spacer mechanically supports the waterproof membrane while compressing to compensate for a pressure differential on the waterproof membrane when the microphone assembly is submerged underwater.

16. The microphone assembly of claim 9, wherein the adhesive is a pressure sensitive adhesive.

17. A microphone assembly comprising:
   a microphone coupled to a first surface of a circuit board;
   a compressible spacer coupled to a second surface of the circuit board by an adhesive, wherein the compressible spacer is located entirely on one side of the second surface, and wherein the second surface is diametrically opposite to the first surface;
   a waterproof membrane that is configured to vibrate so that sound waves extend through the waterproof membrane to the microphone; and
   a support structure comprising an opening that extends through the support structure, wherein the support structure is disposed between the waterproof membrane and the compressible spacer, and wherein the support structure is in direct contact with the waterproof membrane and is comprised of a rigid material.

18. The microphone assembly of claim 17, wherein the rigid material is plastic, ceramic, or metal.

19. The microphone assembly of claim 17, wherein the microphone is configured to encode audio signals from the sound waves that extend through the waterproof membrane when the microphone assembly is in a submerged environment.

20. The microphone assembly of claim 19, wherein the waterproof membrane comprises:
   a first side comprising a first side adhesive and
   a second side comprising a second side adhesive, wherein the second side adhesive extends from the second side of the waterproof membrane towards the compressible spacer so that the waterproof membrane is deformable.

* * * * *